Oct. 16, 1928.
A. J. OLSEN
1,687,948
PORTABLE WEEDING DEVICE
Filed June 2, 1926
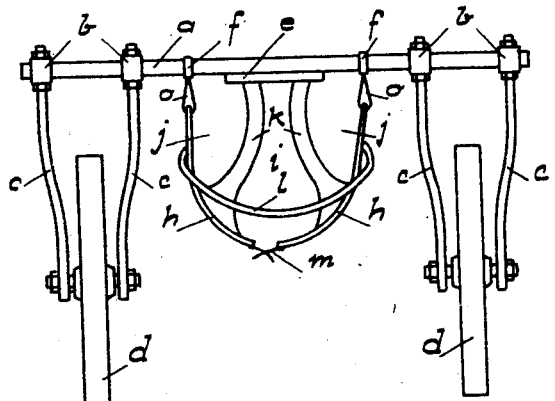
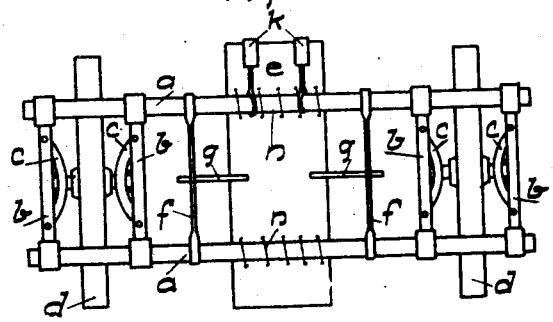
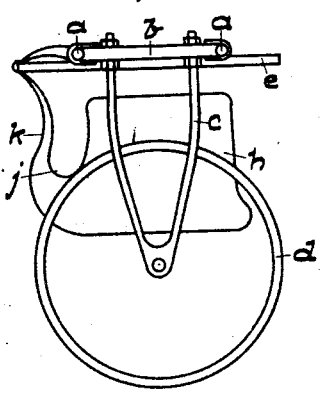
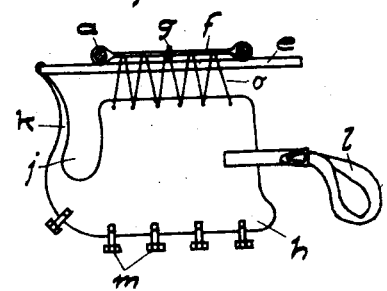
Inventor:
Anton Johannes Olsen Patented Oct. 16, 1928.

1,687,948

UNITED STATES PATENT OFFICE.

ANTON JOHANNES OLSEN, OF SOLLSTED, LOLLAND, DENMARK.

PORTABLE WEEDING DEVICE.

Application filed June 2, 1926, Serial No. 113,310, and in Denmark June 25, 1925.

When weeding turnip fields and similar fields, the farm-hand doing the work must crawl on his knees and support his upper body partly by his thighs and his left arm and hand, the right arm and hand being required for effecting the weeding. This position of the body is very uncomfortable, the knees become soon weary, as does the left hand and arm also, and the left hand cannot take a part in the weeding work.

These drawbacks are obviated by the present invention which relates to a portable frame intended to carry the upper body of the weeding farm-hand, so that his knees are relieved from the weight and pressure of his body, and he can use both hands for the weeding work.

A constructional form of this portable frame is illustrated diagrammatically and by way of example on the accompanying drawing on which Figure 1 is a rear view, Figure 2 a plan, and Figure 3 a side view thereof; Figure 4 shows some details.

The frame proper which is the uppermost part of the structure is composed of two parallel rods $a$, preferably bamboo-rods, and of four cross-bars $b$ connecting said rods with each other. From each bar $b$ extends downwardly a V-shaped member $c$. The bars $b$ are arranged in two pairs, and each pair of the V-shaped members carries a wheel $d$ designed, preferably, as an ordinary bicycle wheel.

An oblong board $e$ arranged at right angles with respect to the rods $a$ is attached to the lower side of the two rods $a$, and secured thereto for instance by cords $n$, Fig. 2. Laterally from the board $e$ the rods $a$ are connected with each other also by two endless ropes $f$ which can be tensioned by two arms $g$, each of which is inserted between the superposed parts of one of the endless ropes $f$ whereby these parts can be turned around one another, the respective arm being turned in a vertical plane lying parallel to the rods $a$ and between them. This tensioning having been effected, the free ends of the arms $g$ are retained in their position by the board $e$.

The ropes $f$ carry a flexible body support $h$ by means of cords $o$, Figs. 1 and 4; this body support or carrier consists of linen or other soft material and is preferably two-parted, the two parts being connected with each other by buckles or clasps $m$ whereby the width of the carrier $h$ can be accommodated to the thickness or slenderness of the body of the respective farm-hand. Each half of the body carrier $h$ has a considerably smaller extension $k$ extending first forwardly and then upwardly, Figs. 1 and 4, whereby three large openings $j$, $i$, $j$, are formed. Through the opening $i$ the farm-hand puts his head, and through the openings $j$, $j$ he puts his arms, that is to say, both arms for doing the weeding work. The upper ends of the extensions $k$ are affixed to the front end of the board $e$.

The body carrier $h$ is being so adjusted relatively to the figure of the respective farm-hand, as well as to the ground, that the knees of that farm-hand are in touch with the ground so much as to enable him to push the portable frame forward according to the progress of the weeding. The frame may be moved, however, also by the hands of the farm-hand if he prefers this manner.

The distance between the wheels is such that the frame can be moved along between the rows of the plants without doing any damage to them.

The weeding work is greatly facilitated by the device described, and the efficiency is double that otherwise attained.

I wish it to be understood that I do not limit myself to the details shown and described merely by way of example. There may be variations in size and shape and materials and the like without departing from the gist of the invention.

I claim :

A portable device for facilitating weeding, comprising, in combination, an oblong frame extending at right angles with respect to the direction of movement of the device, wheels supporting said frame at its short sides, and a two-parted body carrier suspended from the mid-portion of said frame and adapted to receive the front-portion of the upper body of the respective farm-hand, each body carrier portion having a forwardly and upwardly directed extension connected with the said frame at its free end, substantially and for the purpose set forth.

In testimony whereof I affix my signature.

ANTON JOHANNES OLSEN.